Sept. 18, 1928.
J. H. COLLIER ET AL
1,684,475
FUEL TANK ATTACHMENT
Filed Feb. 21, 1927
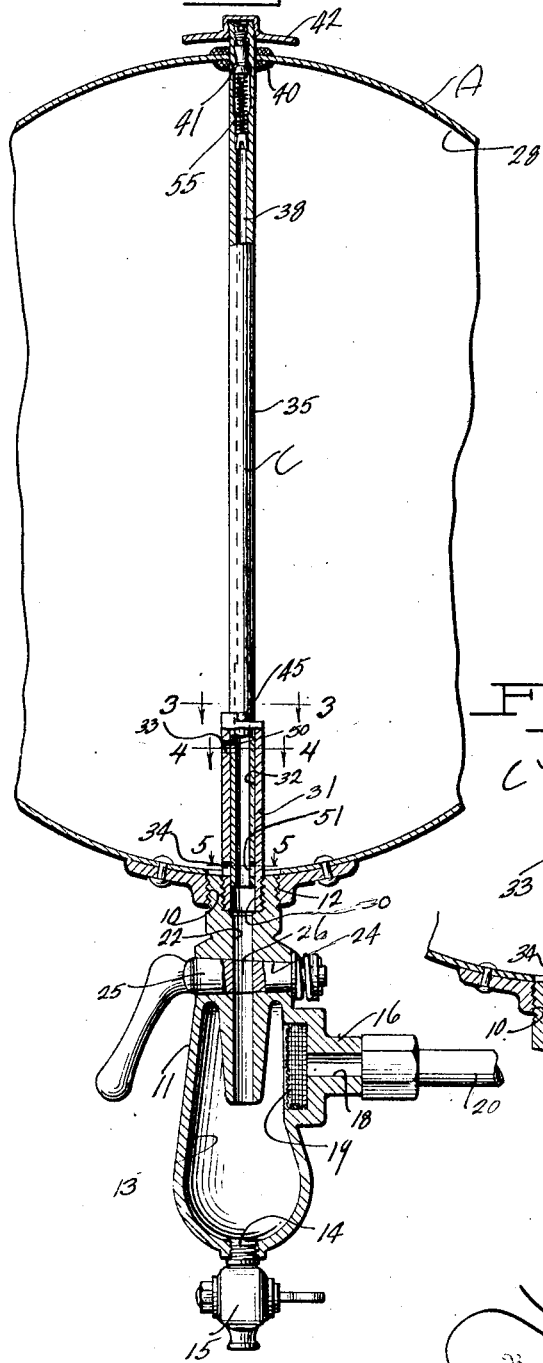
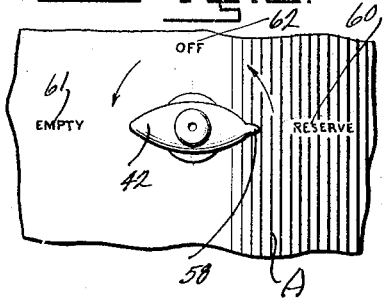
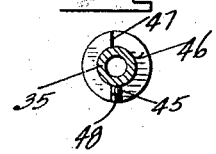
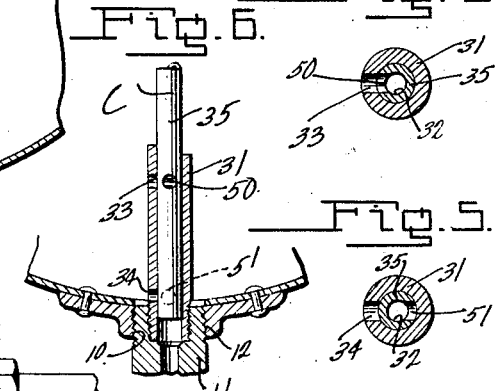
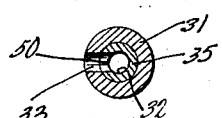
John H. Collier and
Earl D. Chisum,
Inventors Patented Sept. 18, 1928.

1,684,475

UNITED STATES PATENT OFFICE.

JOHN H. COLLIER AND EARL D. CHISUM, OF ALTUS, OKLAHOMA; SAID CHISUM ASSIGNOR TO SAID COLLIER.

FUEL-TANK ATTACHMENT.

Application filed February 21, 1927. Serial No. 169,917.

This invention relates to improvements in fuel tanks and has more particular reference to an attachment at the drain or outlet of the tank which includes a construction to facilitate the retention of a reserve supply in the tank; which may be utilized to feed fuel under pressure from a normally gravity operated system; and which may be used to facilitate cleaning of sediment and other foreign materials from the drain lines.

The primary object of the invention is the provision of means associated with a fuel tank for pressure feed of fuel in an economical and efficient relation.

Other objects and advantages of this invention will be apparent during the course of the following detailed description.

In the accompanying drawings, forming a part of this specification, and wherein for the purpose of illustration is shown the preferred form of the invention.

Figure 1 is a fragmentary view, partly in section, showing the improved attachment mounted upon a conventional type of fuel tank.

Figure 2 is a plan view showing the regulating end of the improved attachment.

Figures 3, 4 and 5 are sectional views taken substantially on their respective lines in Figure 1 of the drawings.

Figure 6 is a view showing a differently adjusted position than that illustrated in Figure 1, when the device is set to blow the pipe lines for cleaning sediment therefrom.

In the drawings, wherein similar reference characters designate corresponding parts throughout the several views, the letter A may generally designate a fuel tank of approved characteristics, with which the preferred outlet regulating device C is associated.

The tank A is used upon certain automotive vehicles where the top of the tank is readily accessible to operators, such as the type of gasoline tank which is placed under the front seat of the vehicle. In this type of tank a threaded outlet opening 10 is provided in the bottom thereof, adapted to detachably receive an approved pet cock or sediment valve regulator. The tank A is provided with a trap casing 11, having an externally screw threaded shank 12 at an end thereof, for detachable threading in the opening 10, so that the casing 11 preferably vertically depends below the tank A. The casing 11 may be of any approved size, and is provided with a compartment therein adapted to receive sediment, or a minor supply of fuel. In the extreme bottom of the compartment 13 the casing 11 is provided with an opening 14, in which is detachably positioned a simple pet cock 15, which may be opened to permit drain of foreign materials which may settle in the lower portion of the compartment 13. At the intermediate portion of the casing 11, a lateral tubular extension 16 may be provided, having a duct 18 communicating with the compartment 13 at the upper end thereof, and if desired a suitable screen 19 may be placed over the duct 18, to strain the fluid which passes ultimately thru the duct 18 and thence into the pipe line 20 to the carburetor or other location. The casing 11 is suitably provided with a duct 22 leading downwardly therethrough to drain the contents of the tank A into the reservoir or compartment 13, and thru the casing 11 intersecting the duct 22 is a preferably tapered passageway 24, adapted to receive a regulating valve 25, which has a transverse duct 26 therein which may be placed in or out of registration with the duct 22 for controlling flow of gasoline or fuel from the tank compartment 28 into the minor reservoir or compartment 13, as is obvious from the drawings.

The upper end of the casing 11 is provided with a screw threaded socket 30, axial of the drain duct 22, and facing the compartment 28 of tank A, into which the lower screw threaded end of an upright tube 31, detachably fits, the tube 31 having a passageway 32 therealong, open at the top of the tube 31, and thru this passageway 31 upper and lower laterally extending ports 33 and 34 are provided, communicating with the reservoir or compartment 28 of the tank A.

A tubular valve member 35 is provided, of a diameter about equivalent to the diameter of the passageway 32; the lower end of said tubular valve member 35 being adapted to rotatably fit in the passageway 32. The tubular valve member 35 is provided with a passageway 38 therethrough, open at both ends of the tubular member, and the tank A is adapted to receive the tubular valve member 35 in an upright substantially diametrically disposed relation; the upper end of the tank A having a bushing 40 therein, provided with a passageway 41 for detachably receiving said upper end of the tubular valve member 35. The upper end of the tubular valve member 35 projects above the tank A, and thereon it is provided with a detachable cap 42, to cover the upper end of the said tube 35; the same being screw threaded preferably on the upper end of the tube 35 exteriorly of the tank, so that it may be tightened thereon to bodily rotate the tube 35 thru a limited arc of movement. The fit of the tube 35 in the bushing 40 permits its rotation, since this is a slidable fit, although leak-proof, and the tube 35 is provided with a lateral pin extension 45 which rests upon a top edge 46, preferably at the top of the tubular extension 31 above mentioned; the pin 45 being movable over the edge 46, and the extension 31 having a raised portion at the opposite side thereof from the top edge 46, to provide end shoulders 47 and 48 against which the pin 45 abuts to limit the amplitude of rotation of the tube 35 thru an arc of substantially 180°.

The tubular valve member 35 when supported in the vertical relation shown in the drawings and as above described, has a port 50 in the same horizontal plane as the port 33 of the extension 31, adapted to be placed in or out of alignment with the port 33; and in a diametrically opposed location, but farther lower down, the tubular valve member 35 has a second port 51 adapted to lie in the same plane with the port 34 of the extension 31, and this port 51 may be aligned with the port 34, but only in event the port 50 is not aligned with the port 33; or vice versa.

In the upper end of the passageway 38 of the tubular valve member 35 is provided a seat having a detachable check valve 55 therein, of practically the same construction as the ordinary pneumatic tire valve, which operates to permit air under pressure to be inserted into the passageway 38, and prevents the return of the air pressure.

As to a description of the invention, the cap 42 may be provided with an indicator extension 58 thereon, and the tank A may have indicia 60, 61 and 62 thereon designating the various positions of the valve 35. Under normal running conditions, the indicator 58 will point to the indicia 60, ordinarily designated "Reserve", and in this arrangement of parts the tubular valve 35 will be positioned as illustrated in Figure 1 with respect to the tubular extension 31, to align the upper ports 50 and 33, but to place the lower ports 34 and 51 out of alignment, so that gasoline or fuel from the tank compartment 28 flows thru the aligning ports 33 and 50, into the passageway 38 of the tubular valve 35, and flows downwardly therethrough into the duct 22, and past the valve 25, if open, into the auxiliary reservoir 13, from which location the sediment is extracted, as conventionally known, and the fuel then flows thru the fuel line 20. By this arrangement the amount of fuel in the tank compartment 28, below the horizontal plane intersecting the ports 33 and 50, will remain in the fuel tank as a reserve, and when the engine stalls due to lack of fuel, the operator is aware that he must turn on the reserve, and then it is merely necessary to turn the handle 42, which swings the tubular valve member 35 thru an arc of substantially 180° until the indicator 58 points to the indicia 61 designated "Empty", and in this relation of parts the ports 34 and 51 will be aligned, at the extreme bottom of the compartment 28, to permit the fuel to drain from the compartment 28 thru the duct 22 and into the reservoir 13, as is obvious.

In event it is desirable to pressure feed the fuel from the tank A, the tubular valve 35 may be positioned with the indicator 58 pointing to either the indicia 60 or 61, and the cap 42 is then removed, and air pressure pumped past the check valve 55 into the tubular valve 35, and which pressure then passes into the tank 28 over the head of fuel therein and forces the fuel downwardly thru the duct 22 into the line 20, as is obvious. Under such circumstances, it may be desirable to drain fuel from the compartment 13, and in this event the main reservoir 28 is shut off by turning the handle until the indicator 58 points to the indicia 62 designated "Off", and in this position the ports 50 and 51 are out of alignment with their ports 33 and 34, and flow of fuel from the tank compartment 28 into the casing compartment 13 is prevented, as is quite obvious. The air pressure then pumped into the tubular valve 35 will act over the head of fuel in the compartment 13 to force whatever fuel is above the line 20, into the line 20. In this position, also the sediment may be cleaned from the feed lines and passageways thru which the fuel flows, since all communication with the tank 28 is shut off, and the closed relation of the ports of the tubular valve 35 with respect to the ports of the extension 31 is illustrated in Figure 6 of the drawings and designates just how the simple attachment may be operated to permit cleaning of the lines of foreign particles.

From the foregoing description of this invention it is apparent that a novel attachment for use in connection with the fuel tanks of internal combustion engines, has been provided, which may be economically manufactured, and which is susceptible of easy installation, without alteration to the main tanks. The device is meritorious not alone in view of the fact that it may retain a reserve supply of fuel for emergency use; but the device is meritorious in that under emergency conditions, such as sometimes occur in a gravity feed system, the fuel may be fed under pressure; and the device is meritorious in view of the pressure means which may be utilized for cleaning foreign agencies from the pipe line.

Various changes in the shape, size, and arrangement of parts may be made to the form of invention herein shown and described, without departing from the spirit of the same or the scope of the claims.

We claim:

1. In a fuel tank attachment of the class described a tank having a compartment therein, the tank having an outlet opening in the bottom thereof, a tube extending from the outlet opening upwardly into the tank compartment having spaced upper and lower drain ports transversely therein, a rotatable tube bearing at its lower end in said first mentioned tube and extending vertically across the tank compartment and at the top of the tank compartment extending therethrough, the said last mentioned tube having upper and lower ports adapted to alternately register with the ports of the first mentioned tube, means to limit the amplitude of movement of the second mentioned tube with respect to the first mentioned tube, an air pressure check valve detachably supported in the top of the second mentioned tube, a detachable cap exteriorly of the tank for the second mentioned tube, a drain trap connected with the tank having a compartment therein below the tank and a passageway extending between the outlet opening of the tank and the trap compartment, a valve in said trap for closing said passageway, and an outlet conduit connected with said trap.

2. In a fuel tank attachment of the class described a tank having a compartment therein, the tank having an outlet opening in the bottom thereof, a tube extending from the outlet opening upwardly into the tank compartment having spaced upper and lower drain ports transversely therethrough, a rotatable tube bearing at its lower end within the first mentioned tube and extending upwardly across the tank compartment and at the top of the tank compartment extending from the tank and having means on its upper outer end for attaching a pump thereto, a check valve in the tube adjacent its upper end, the said rotatable tube having upper and lower ports therein adapted to alternately and respectively align with the upper and lower ports of the first mentioned tube, a drain cock connected with the outlet opening in the tank including a valve which may close the outlet opening so that air may be pumped into the tank through the rotatable tube and through the ports of the two tubes with the drain cock having its valve closing the outlet opening in order to build up pressure in the tank so that upon opening of the drain valve the air will clean sediment from the aligning ports of the two tubes and from the outlet opening and drain cock.

JOHN H. COLLIER.
EARL D. CHISUM.